United States Patent
Wolff et al.

(10) Patent No.: US 10,384,546 B2
(45) Date of Patent: Aug. 20, 2019

(54) SYSTEM AND METHOD FOR CONTROLLING A VEHICLE

(71) Applicant: GENERAL ELECTRIC COMPANY, Schenectady, NY (US)

(72) Inventors: Jeffrey John Wolff, Erie, PA (US); Douglas Vroman, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 201 days.

(21) Appl. No.: 15/149,665

(22) Filed: May 9, 2016

(65) Prior Publication Data
US 2016/0250931 A1    Sep. 1, 2016

Related U.S. Application Data

(63) Continuation-in-part of application No. 14/899,261, filed as application No. PCT/US2015/011184 on Jan. 13, 2015, now Pat. No. 10,173,532.
(Continued)

(51) Int. Cl.
| | |
|---|---|
| *B60L 7/18* | (2006.01) |
| *B60T 8/172* | (2006.01) |
| *B60L 7/26* | (2006.01) |
| *B60T 10/00* | (2006.01) |
| *B60T 13/58* | (2006.01) |
| *B60T 13/66* | (2006.01) |
| *F16D 57/00* | (2006.01) |

(52) U.S. Cl.
CPC ............................ *B60L 7/18* (2013.01); *B60L 7/26* (2013.01); *B60T 8/172* (2013.01); *B60T 10/00* (2013.01); *B60T 13/586* (2013.01); *B60T 13/588* (2013.01); *B60T 13/662* (2013.01); *F16D 57/00* (2013.01); *B60T 2260/08* (2013.01)

(58) Field of Classification Search
CPC ... B60L 7/18; B60L 7/26; B60T 8/172; B60T 10/00; B60T 13/586; B60T 13/588; B60T 13/662; B60T 2260/08; F16D 57/00
See application file for complete search history.

(56) References Cited

U.S. PATENT DOCUMENTS

| | | | |
|---|---|---|---|
| 5,351,775 A | 10/1994 | Johnston et al. | |
| 5,496,098 A * | 3/1996 | Brearley | B60T 1/08 303/22.2 |

(Continued)

FOREIGN PATENT DOCUMENTS

WO    WO-2007139489 A1 * 12/2007 .............. B60T 8/00

*Primary Examiner* — Sze-Hon Kong
(74) *Attorney, Agent, or Firm* — Philip S. Hof; The Small Patent Law Group, LLC (57) ABSTRACT

A braking system includes a drive system having a traction motor coupled in driving relationship to a wheel of a vehicle, a braking device configured to brake the vehicle, and a control unit. The motor is configured to provide both motive power for the vehicle in a propel mode of operation and retarding effort to brake the vehicle. The control unit is configured to determine a total retarding effort required to brake the vehicle in a braking mode of operation, and an amount of traction motor retarding effort available from the traction motor. The control unit is further configured to control the traction motor and the braking device so that at least one of the traction motor and the braking device brake the vehicle in the braking mode of operation.

18 Claims, 3 Drawing Sheets

Related U.S. Application Data (60) Provisional application No. 61/930,040, filed on Jan. 22, 2014, provisional application No. 61/926,503, filed on Jan. 13, 2014.

(56) References Cited

U.S. PATENT DOCUMENTS

| | | | | |
|---|---|---|---|---|
| 5,511,859 | A | 4/1996 | Kade et al. | |
| 7,120,532 | B2 * | 10/2006 | Persson | B60T 1/087 701/93 |
| 8,386,131 | B2 * | 2/2013 | Thaduvayi | B60K 6/46 701/36 |
| 9,187,079 | B2 * | 11/2015 | Antao | B60T 7/042 |
| 2003/0000763 | A1 * | 1/2003 | Colling | B60K 20/06 180/333 |
| 2006/0207842 | A1 * | 9/2006 | Strandberg | B60T 5/00 188/264 D |
| 2010/0025167 | A1 * | 2/2010 | Staub | B60L 7/22 188/156 |
| 2011/0022276 | A1 * | 1/2011 | Thaduvayi | B60K 6/46 701/48 |
| 2011/0285197 | A1 * | 11/2011 | Ganzel | B60T 7/042 303/2 |
| 2012/0317968 | A1 * | 12/2012 | Fudouji | B60T 5/00 60/468 |
| 2013/0047955 | A1 * | 2/2013 | Reedy | B60T 10/00 123/320 |
| 2013/0240312 | A1 * | 9/2013 | Jensen | B60T 1/062 188/271 |
| 2014/0316669 | A1 * | 10/2014 | Rudberg | B60T 13/586 701/70 |
| 2015/0274143 | A1 * | 10/2015 | Miyazaki | B60T 8/348 303/9.61 |
| 2015/0298664 | A1 * | 10/2015 | Nimura | B60T 8/36 701/70 |
| 2015/0344018 | A1 * | 12/2015 | Shimoyama | B60K 6/48 701/22 |
| 2016/0001756 | A1 * | 1/2016 | Konishi | B60T 8/1893 701/19 |
| 2016/0039292 | A1 * | 2/2016 | Takahashi | B60W 10/08 701/70 |
| 2016/0137179 | A1 * | 5/2016 | Rudberg | B60T 8/1761 701/71 |
| 2016/0186857 | A1 * | 6/2016 | Mei | F16H 63/48 701/65 |
| 2016/0362006 | A1 * | 12/2016 | Ruth | B60L 7/26 |
| 2017/0008400 | A1 * | 1/2017 | Katsuta | B60L 3/0015 |
| 2017/0057476 | A1 * | 3/2017 | Schwartz | B60T 8/172 |
| 2017/0182988 | A1 * | 6/2017 | Kawakami | B60T 7/042 |
| 2017/0212013 | A1 * | 7/2017 | Ishii | G01M 17/007 |
| 2017/0240151 | A1 * | 8/2017 | Hill | B60T 8/1708 |
| 2017/0313290 | A1 * | 11/2017 | Finkl | B60T 11/21 |

* cited by examiner

SYSTEM AND METHOD FOR CONTROLLING A VEHICLE

CROSS-REFERENCE TO RELATED APPLICATIONS

This application is a continuation-in-part of U.S. application Ser. No. 14/899,261, filed on Dec. 17, 2015, which is a National Phase of International Application Serial No. PCT/US2015/011184, filed on Jan. 13, 2015, which claims benefit of U.S. Provisional Application Ser. No. 61/930,040 filed on Jan. 22, 2014, and 61/926,503 filed on Jan. 13, 2014.

BACKGROUND

Technical Field

Embodiments of the invention relate generally to vehicles. Certain embodiments relate to systems and methods for controlling a vehicle.

Discussion of Art

In some vehicles, electrically motorized wheels propel or retard the vehicle. In particular a large horsepower diesel engine may be used with an alternator, a traction inverter, and wheel drive assemblies housed within the rear tires of the vehicle. In operation, a diesel engine drives an alternator, which powers the traction inverter. The traction inverter includes semiconductor power switches that commutate the alternator output current to provide electrical power to electric drive motors, e.g., AC traction motors, of the wheel drive assemblies, which transform the electrical power back into mechanical power to drive the wheels and propel the vehicle.

The traction motors provide the tractive power to propel a vehicle. The traction motors provide a braking force for controlling speed or for slowing the vehicle. This is commonly referred to as dynamic braking. Simply stated, when a traction motor is not needed to provide motive force, it can be reconfigured so that the motor operates as a power generator. So configured, the traction motor generates electric energy which has the effect of slowing the vehicle.

Certain vehicles may also be equipped with a service brake that is manually actuatable by an operator to provide a friction braking force to one or more wheels of the vehicle to stop or slow the vehicle. For example, existing service brakes typically require manual actuation by an operator of the vehicle, such as by depressing a pedal on the floor of the vehicle, which causes pressure to be applied to brake pads to slow or stop the vehicle.

In view of the above, there may be a need for a system and method which differs from those systems that are currently available.

BRIEF DESCRIPTION

In an embodiment, a braking system includes a drive system having a traction motor coupled in driving relationship to a wheel of a vehicle, a braking device configured to brake the vehicle, and a control unit. The motor is configured to provide both motive power for the vehicle in a propel mode of operation and retarding effort to brake the vehicle. The control unit is configured to determine a total retarding effort required to brake the vehicle in a braking mode of operation, and an amount of traction motor retarding effort available from the traction motor. The control unit is further configured to control the traction motor and the braking device so that the traction motor and/or the braking device brake the vehicle in the braking mode of operation.

In an embodiment, a vehicle includes a drive system, a braking device configured to brake the vehicle, and a controller communicatively coupled to the drive system and the braking system. The drive system includes a traction motor that is connected in driving relationship to a wheel of the vehicle. The motor is configured to provide both motive power to propel the vehicle in a propel mode of operation and retarding effort to brake the vehicle. The controller is configured to determine a total retarding effort required to brake the vehicle in a braking mode of operation, and an amount of traction motor retarding effort available from the traction motor and, in response to the determination, to control the traction motor and the braking device so that the traction motor and/or the braking device brake the vehicle in the braking mode of operation.

In an embodiment, a method (e.g., a method for controlling a vehicle) includes receiving a braking command, determining a total amount of retarding effort required execute the braking command, providing a first amount of braking effort from a traction motor operating in a dynamic braking mode of operation, and providing a second amount of braking effort from a service brake. The first amount of braking effort and the second amount of braking effort equal approximately the total amount of retarding effort.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use with both mobile and stationary implementations, for ease of explanation a mobile implementation is described in detail herein. More specifically, an off-highway vehicle (OHV) haul truck has been selected for clarity of illustration for the disclosure of mobile embodiments. Other applicable vehicles include, however, other OHV's (e.g., locomotives and other rail vehicles, construction equipment, other mining vehicles), on-road vehicles, industrial equipment, and marine vessels. As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily a mechanical attachment.

Embodiments of the invention relate generally to vehicle control. Certain embodiments relate to systems and methods for braking a vehicle. In one embodiment, a braking system for a vehicle includes a drive system having a traction motor coupled in driving relationship to a wheel of a vehicle, the motor being configured to provide both motive power for the vehicle in a propel mode of operation and retarding effort to brake the vehicle, a braking device configured to brake the vehicle, and a control unit. The control unit is configured to determine a total retarding effort required to brake the vehicle in a braking mode of operation, and an amount of traction motor retarding effort available from the traction motor. The control unit is further configured to control the traction motor and the braking device so that at least one of the traction motor and/or the braking device brake the vehicle in the braking mode of operation. The braking device is operable to provide supplemental braking effort in situations where retarding effort from the traction motors operating in a dynamic braking mode of operation is not available or sufficient to stop or slow the vehicle.

Figure 1:
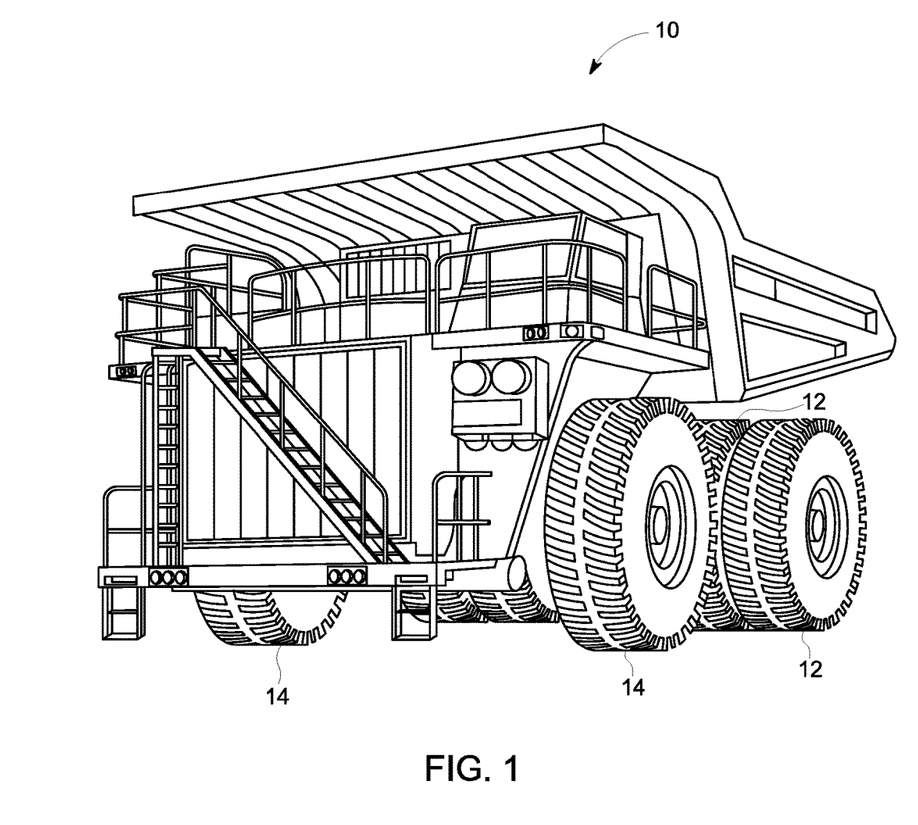
FIG. 1 is a perspective view of an off-highway vehicle, according to an embodiment of the invention.

An embodiment of the inventive braking system is configured for use with a vehicle, such as an OHV 10 as depicted in FIG. 1. As shown, the OHV 10 is supported on paired dual rear drive tire assemblies 12 and on single front steering tire assemblies 14. The rear drive tire assemblies 12 are driven by a drive system described below in connection with FIG. 2.

Figure 2:
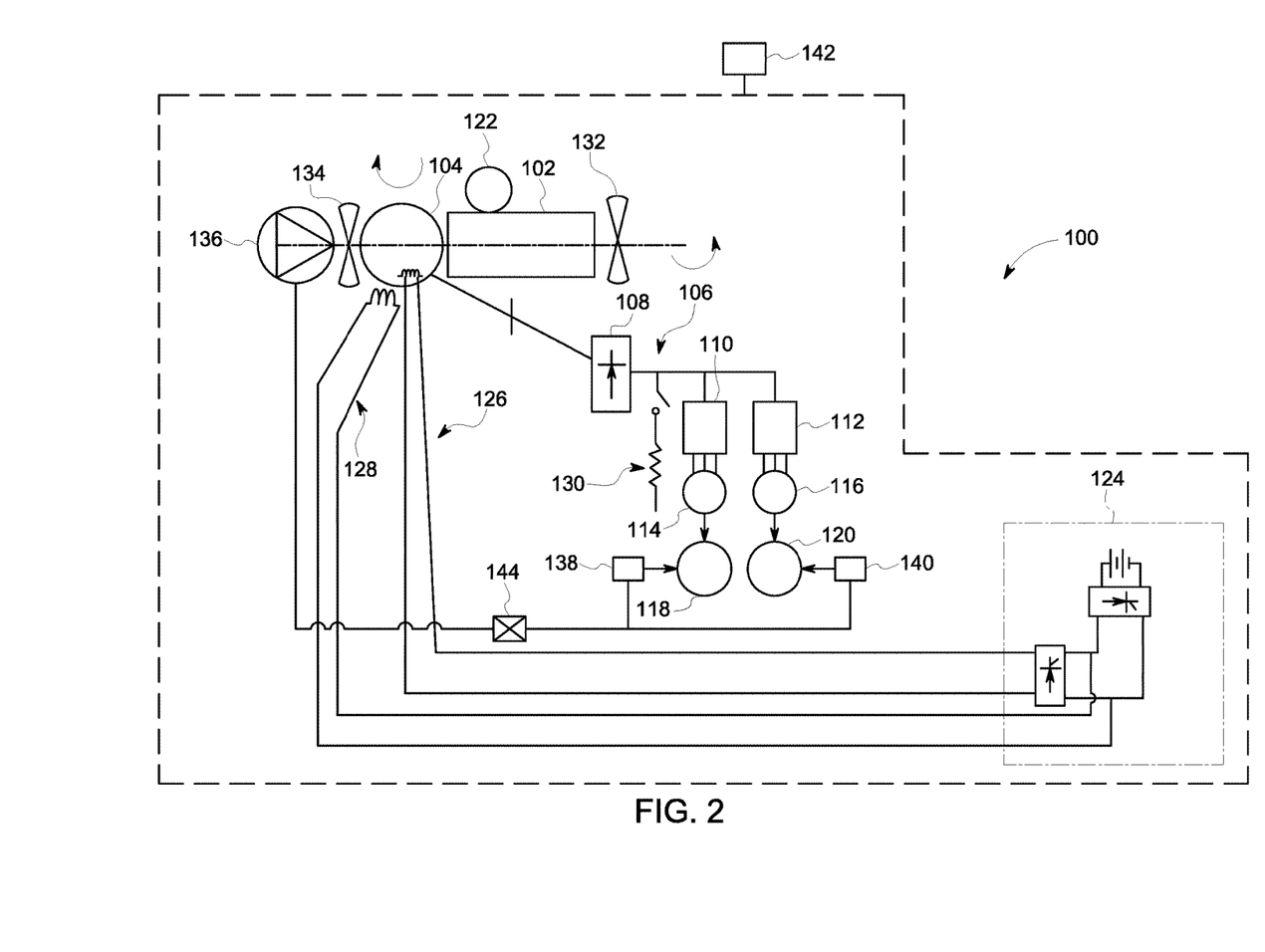
FIG. 2 is a schematic diagram of a drive system of the vehicle of FIG. 1, according to an embodiment of the invention.

FIG. 2 schematically illustrates an exemplary drive system 100 for an electric drive machine such as OHV 10 or other vehicle. The drive system 100 includes a primary power source such as an engine 102 (e.g., a diesel engine, a gasoline engine, a multi-fuel engine, etc.) and a traction alternator/generator 104 mechanically coupled to and driven by the engine 102. As illustrated in FIG. 2, the traction alternator 104 is electrically coupled to a traction bus 106. The alternator 104 is configured to provide AC electric power to one or more rectifiers 108, which are electrically connected to one or more power converters, e.g., first and second inverters 110, 112, via the traction bus 106. The inverters 110, 112 are connected to first and second traction motors 114, 116 associated with first and second wheels of the vehicle, e.g., rear wheels 12 (including first rear wheel 118 and second rear wheel 120) of vehicle 10, respectively. As is known in the art, the rectifier 108 is configured to convert the AC power received from the alternator 104 into a DC output which is then fed to the inverters 110, 112 through the traction bus 106. The inverters 110, 112 are configured to supply three-phase, variable frequency AC power to the first and second traction motors 114, 116 associated with the first and second wheels 118, 120 of the vehicle 10 (typically the rear wheels of the vehicle). While the rectifier 108 is illustrated as being separate from the traction alternator 104, in certain embodiments, the rectifier may form a part of the alternator, as is known in the art. In an embodiment, the traction bus 106 is 1000-1500 VDC bus.

As also shown in FIG. 2, in an embodiment, a starter motor 122 may be associated with the engine 102 for rotating the engine 102 so as to initiate operation, as is known in the art. In addition, the vehicle may include a battery 124, e.g., a 24V battery, electrically coupled to the alternator 104 through a tertiary winding 126 and a field winding 128. The battery 124 is configured to function as an alternator field static exciter to initiate operation of the electric drive system 100 of the vehicle 10.

The traction motors 114, 116 provide the tractive power to move the vehicle, and may be AC or DC electric motors. When using DC traction motors, the output of the alternator is typically rectified to provide appropriate DC power. When using AC traction motors, the alternator output is typically rectified to DC and thereafter inverted to three-phase AC before being supplied to the traction motors 114, 116. During a propel mode of operation, power may be transferred from the engine 102 to the traction motors 114, 116, and thus to the wheels 118, 120 of the vehicle 10 to effect movement.

In addition to providing motive power, the traction motors 114, 116 also provide a braking force or braking effort for controlling the speed of the vehicle 10 on which the drive system 100 is deployed. This is commonly referred to as dynamic braking. During a dynamic braking mode of operation, such as when motion of the vehicle is to be retarded, power may be generated by the mechanical rotation of the drive wheels and directed toward a retarding grid 130. In particular, the kinetic energy of the vehicle 10 may be converted into rotational power at the drive wheels 118, 120. Rotation of the drive wheels may further rotate the motors 114, 116 so as to generate electrical power, for example, in the form of AC power. The inverters 110, 112 may serve as a bridge to convert the power supplied by the motors 114, 116 into DC power. Dissipation of the DC power generated by the motors 114, 116 may produce a counter-rotational torque at the drive wheels 118, 120 to decelerate the vehicle 10. Such dissipation may be accomplished by passing the generated current provided by the inverters 110, 112 through a resistance, such as the dynamic braking grid 130, or retarding grid, as shown.

As further illustrated in FIG. 2, the drive system 100 also includes an engine radiator fan 132 driven by the engine 102 to provide cooling for the engine 102. The system 100 may also include one or more control and motor cooling fans 134 mechanically coupled to the alternator 104. The cooling fan(s) 134 is configured to provide cooling for all components of the traction drive system, such as inverters 110, 112, traction motors 114, 116 and the like.

The traction alternator 104 may also be coupled to a hydraulic pump 136 which provides hydraulic pressure for use by accessories or other components of the vehicle. For example, the hydraulic pump 136 may be configured to provide hydraulic pressure for use by braking devices, such as one or more hydraulic service brakes 138, 140 associated with one or more wheels of the vehicle 10 (e.g., depicted in FIG. 2 as being associated with wheels 118, 120). The hydraulic service brakes 138, 140 are operable to provide a frictional braking force or braking effort for the wheels 118, 120 in order to stop of slow the vehicle, and may be utilized to supplement, or in place of, the braking effort provided by the traction motors 114, 116 when operating in the dynamic braking mode of operation. In an embodiment, the hydraulic service brakes 138, 140 are fluidly coupled to hydraulic pump 136 and include one or more electro-hydraulic proportional valves 144, the position of which may be controlled by a controller, as discussed hereinafter, to control an amount of braking effort provided by the brakes 138, 140. Other types of valves may also be utilized.

While the vehicle 10 described herein is disclosed as including braking devices in the form of hydraulic service brakes, other types of service brakes may also be utilized on-board the vehicle without departing from the broader aspects of the invention. For example, the service brakes may be any type of frictional brake known in the art that utilize a wear surface that contacts (e.g., by clamping or pressing against) a rotating or moving component of a wheel of the vehicle to slow or stop the rotation of the wheel by friction in order to slow or stop the vehicle. Forcing of the wear surface of the frictional brake against a portion of the wheel (e.g., a disc, drum, etc.) may be accomplished mechanically, hydraulically, pneumatically or electromagnetically.

Regardless of the particular type of service brake utilized, the braking devices 138, 140 may be manually deployed or actuated by an operator of the vehicle such as, for example, by depressing a brake pedal within an operator cab or by pressing a button on a user interface, although other means of initiating the frictional contact of the brake with a rotating wheel component may also be utilized. In an embodiment, application of the service brakes 138, 140 may also be controlled automatically by a controller or control unit of the vehicle. In particular, as further illustrated in FIG. 2, the drive system 200 and various components thereof, including the braking devices 138, 140 may be electrically coupled (or otherwise in communication with) and controlled by a controller 142. In particular, the controller 142 is configured to control the traction motor system 200 and the various components thereof, and the electricity supplied to and from the traction motor system, as is known in the art.

In an embodiment, the controller 142 is configured to control the drive system 200 to propel the vehicle in response to a propel command received from an operator, as well as brake or slow the vehicle in response to a retard command utilizing the drive system 200 (i.e., using the traction motors 114, 116 operating in a dynamic braking mode of operation) and/or the braking devices 138, 140. For example, in a braking mode of operation, the controller 142 is configured to determine a total retarding effort required to slow or stop the vehicle in response to a retard command or setting, as well as an amount of retarding effort available from the traction motor(s) 114, 116. As used herein, "retarding effort" means the dynamic braking effort provided by the traction motors of the vehicle operating in a braking mode of operation. The controller 142 is further configured to control the traction motors 114, 116 and the braking devices 138, 140 so that at least one of the traction motor and braking device brake the vehicle in the braking mode of operation.

In an embodiment, if the amount of traction motor retarding effort available from the traction motors 114, 116 is greater than or equal to the total retarding effort required to brake or slow the vehicle, then the controller 142 controls the traction motors to provide the full amount of retarding effort (i.e., the service brakes 138, 140 are not deployed). The traction motors 114, 116 are therefore configured to operate as the primary braking means for the vehicle 10. If, however, the amount of retarding effort available from the traction motors 114, 116 is less than the total retarding effort required to brake or slow the vehicle as needed, then the controller 142 may automatically control the service brakes 138, 140 to provide a frictional braking effort to brake equivalent to the calculated deficiency. In particular, the controller 142 may control the position of the electro-hydraulic proportional valve 144 to provide hydraulic pressure to the service brakes 138, 140 to apply a braking effort corresponding or equal to the desired retarding effort. In an embodiment, the amount of frictional braking effort provided by the service brakes 138, 140 is the difference between the total retarding effort and the retarding effort available from the traction motors 114, 116. As used herein, "automatically" means without further intervention or input from an operator of the vehicle.

In one embodiment, the controller 142 is configured to automatically actuate the service brakes 138, 140 to provide a necessary level of retarding effort to slow or stop the vehicle 10 where the traction motors 114, 116 are unable or unavailable to provide retarding effort such as, for example, when the drive system 200 resets or fails during operation. In particular, in an embodiment, the controller 142 is configured to automatically deploy the service brakes 138, 140 upon detecting a reset or failure of the drive system 200 in order to stop or slow the vehicle to prevent the vehicle from gaining speed, at least until the drive system 200 is brought back online. In other embodiments, the controller 142 may receive a retard command from an operator. Upon receiving the retard command, the controller 142 may determine whether or not the traction motors 114, 116 are available to provide retarding effort. If they are not available to provide any retarding effort due to drive system reset or failure, the controller 142 may automatically deploy the service brakes 138, 140 to provide the level of braking effort necessary to execute the retard command.

In connection with the above, the controller 142 is operable to control the slowing and stopping of the vehicle 10 in the manner described above in response to a retard request received from a retard pedal. The retard pedal may be a separate pedal or a portion of the brake pedal that is used to provide a retard request/command (as distinguished from braking using the service brakes). A separate brake pedal (that has no retard portion of the pedal) or a retard/brake pedal that includes a potentiometer to register the retard effort request, as well as a brake portion may be utilized for controlling the braking devices 138, 140 for braking. In certain embodiments, the vehicle 10 may include a retard lever or cruise control switch that can be used to input a speed reference that, in turn, can be controlled to determine a required amount of retard effort.

In an embodiment, in a retarding mode of operation, no service braking is used to slow or stop the vehicle so long as sufficient retarding effort is available from the traction motors. In particular, in the embodiments described herein, in response to a retard request (e.g., a request to slow or stop the vehicle other than from a brake pedal or brake portion of a combined brake/retard pedal), the controller 142 is operable to determine if, and how much, retarding effort is available to carry out the retard request and, if the traction motors are unable to provide sufficient retarding effort to satisfy the request, to automatically control the service brakes to provide supplemental braking effort to meet the request (i.e., without a braking request input from an operator). Therefore, the controller 142 is configured to control the application of the service brakes in response to a retard request only (i.e., without any braking request/command) to replace the loss of dynamic braking effort to meet the requested retarding effort.

Figure 3:
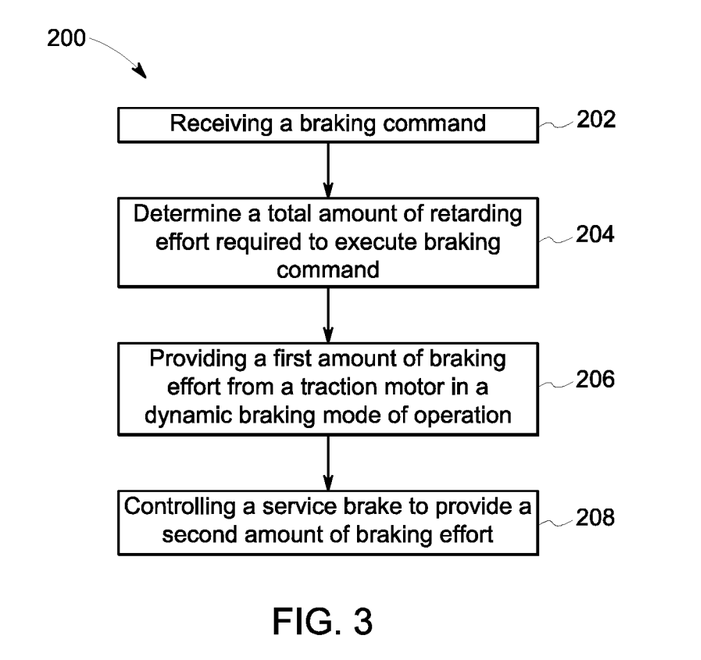
FIG. 3 is a flow diagram of a method of controlling a vehicle, according to an embodiment of the invention.

With reference to FIG. 3, a method 200 of braking a vehicle according to an exemplary embodiment of the invention is illustrated. At step 202, the controller 202 receives a braking command, e.g., from a retard pedal or other operator input. In an embodiment, the braking command may simply be a signal indicating that the drive system has lost power, has a reduced performance, or is otherwise unavailable to provide maximum retarding effort. In response to the braking command, the controller then determines a total amount of retarding effort required to execute the braking command (i.e., to slow the vehicle or stop the vehicle), as step 204. At step 206, the controller controls one or more traction motors to provide a first amount of braking effort in a dynamic braking mode of operation and, at step 208, controls one or more service brakes to provide a second amount of braking effort. As indicated above, the application of the second amount of braking effort may include apply the service brakes at a pressure corresponding to the deficiency of total retarding effort due to the loss of power or reduced performance of the drive system.

By automatically deploying the service brakes 138, 140 when retarding effort from the traction motors 114, 116 is not available, or the amount available is not sufficient to execute the retard command in full, without further input or intervention for an operator, overall vehicle operation may be made safer. In particular, braking or slowing of the vehicle using the braking system of the invention does not depend on an operator's ability to detect a problem with the drive system 200 or to react quickly to brake the vehicle, as braking is fully automated. This gives an operator time to react without the vehicle rapidly accelerating such as if drive system or failure occurs on a downhill grade. In particular, the system of the invention assures that the requested retarding effort is maintained in the event of a drive system loss of power or significantly reduced performance.

As indicated above, the use of a electro-hydraulic proportional valve enables the system to provide a desired level of braking equivalent to the loss in retarding effort from the traction motors. In an embodiment, the valve 144 is applied only to the rear service brakes 138, 140 at the calculated pressure to generate the required braking effort. While configured to be automatically engaged by the controller 142, the system of the invention does not remove or replace the hydraulic brake pedal in the operator's cabin, nor the operator's ability to manually apply the service brakes 138, 140 as desired.

In an embodiment, a braking system is provided. The braking system includes a drive system having a traction motor coupled in driving relationship to a wheel of a vehicle, the motor being configured to provide both motive power for the vehicle in a propel mode of operation and retarding effort to brake the vehicle, a braking device configured to brake the vehicle, and a control unit. The control unit is configured to determine a total retarding effort required to brake the vehicle in a braking mode of operation, and an amount of traction motor retarding effort available from the traction motor. The control unit is further configured to control the traction motor and the braking device so that at least one of the traction motor and the braking device brake the vehicle in the braking mode of operation. In an embodiment, the control unit is configured to control the traction motor to provide the traction motor retarding effort in response to a retard command received by the control unit, and to control the braking device to provide a braking effort if the available traction motor retarding effort is less than the total retarding effort required to brake the vehicle. In an embodiment, the braking effort is provided at an amount equivalent to the difference between the total retarding effort required to brake the vehicle and the available traction motor retarding effort of the traction motor. In an embodiment, the braking device is a hydraulic service brake. In an embodiment, the hydraulic service brake includes an electro-hydraulic proportional valve. The control unit is configured to control a position of the electro-hydraulic proportional valve to control the amount of the braking effort provided by the hydraulic service brake. In an embodiment, the vehicle is an off-highway vehicle. In an embodiment, the hydraulic service brake is operatively connected to a rear wheel of the off-highway vehicle. In an embodiment, the retard command is communicated to the control unit upon actuation of a retard pedal.

In another embodiment, a vehicle is provided. The vehicle includes a drive system including an traction motor connected in driving relationship to a wheel of the vehicle, the motor being configured to provide both motive power to propel the vehicle in a propel mode of operation and retarding effort to brake the vehicle, a braking device configured to brake the vehicle, and a controller communicatively coupled to the drive system and the braking system. The controller is configured to determine a total retarding effort required to brake the vehicle in a braking mode of operation, and an amount of traction motor retarding effort available from the traction motor and, in response to the determination, to control the traction motor and the braking device so that at least one of the traction motor and the braking device brake the vehicle in the braking mode of operation. In an embodiment, the controller is configured to control the braking device to provide a braking effort in an amount approximately equivalent to the difference between the total retarding effort and the available motor retarding effort of the traction motor. In an embodiment, the controller is configured to control the traction motor to provide a first amount of traction motor retarding effort and to control the braking device to provide a second amount of braking retarding effort. The first amount of traction motor retarding effort and the second amount of braking retarding effort, when combined, equal approximately the total retarding effort. In an embodiment, the braking system device includes a hydraulic service brake. The hydraulic service brake may include an electro-hydraulic proportional valve. The controller may be configured to control a position of the electro-hydraulic proportional valve to provide the second amount of braking effort. In an embodiment, the vehicle is an off-highway vehicle. In an embodiment, the hydraulic service brake is operatively connected to at least one rear wheel of the off-highway vehicle. In an embodiment, the vehicle may also include a retard pedal communicatively coupled to the controller, the retard pedal being actuatable by an operator to provide a retard command to the controller, wherein the retard command corresponds to the total retarding effort required to brake the vehicle.

In yet another embodiment, a method is provided. The method includes the steps of receiving a braking command, determining a total amount of retarding effort required execute the braking command, providing a first amount of braking effort from a traction motor operating in a dynamic braking mode of operation, and providing a second amount of braking effort from a service brake. The first amount of braking effort and the second amount of braking effort equal approximately the total amount of retarding effort. In an embodiment, the method may also include the step of determining an amount of braking effort available from the traction motor after receiving the braking command, wherein the second amount of braking effort is approximately equal to the difference between the total amount of retarding effort required to execute the braking command and the amount of braking effort available from the traction drive motor. In an embodiment, providing the second amount of braking effort from the service brake includes controlling a position of an electro-hydraulic proportional valve of the service brake. In an embodiment, receiving the braking command includes receiving the braking command at a control unit of an off-highway vehicle. In an embodiment, providing the second amount of braking effort from the service brake occurs in response to at least one of a loss of power or a reduction in performance of an electric drive system of the vehicle including the traction motor.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A braking system, comprising:
   a drive system having a traction motor coupled in driving relationship to a wheel of a vehicle, the motor being configured to provide both motive power for the vehicle in a propel mode of operation and retarding effort to brake the vehicle;
   a braking device configured to provide braking effort to brake the vehicle;
   a brake pedal of the vehicle operably connected to the braking device for manual control of the braking device, wherein manual actuation of the brake pedal initiates braking effort by the braking device;
   a retard pedal that is a portion of the brake pedal, wherein manual actuation of the retard pedal independent of the brake pedal provides a retard command that is a request for the retarding effort by the traction motor, the retard pedal including a sensor to register the retard command based on the manual actuation of the retard pedal; and
   a control unit configured to determine a total retarding effort required to brake the vehicle in a braking mode of operation and an amount of traction motor retarding effort available from the traction motor;
   wherein the control unit is further configured to control the traction motor and the braking device so that at least one of the traction motor and the braking device brake the vehicle in the braking mode of operation;
   wherein, in response to receiving the retard command upon actuation of the retard pedal independent of actuation of the brake pedal, if the amount of traction motor retarding effort available from the traction motor is less than the total retarding effort required to brake the vehicle, the control unit is configured to control the traction motor to provide the available traction motor retarding effort and
   to automatically control the braking device to provide the braking effort to supplement the available traction motor retarding effort.

2. The braking system of claim 1, wherein the braking effort is provided at an amount equivalent to the difference between the total retarding effort required to brake the vehicle and the available traction motor retarding effort of the traction motor.

3. The braking system of claim 1, wherein the braking device is a hydraulic service brake.

4. The braking system of claim 3, wherein:
   the hydraulic service brake includes an electro-hydraulic proportional valve; and
   the control unit is configured to control a position of the electro-hydraulic proportional valve to control the amount of the braking effort provided by the hydraulic service brake.

5. The braking system of claim 4, wherein the vehicle is an off-highway vehicle.

6. The braking system of claim 5, wherein the hydraulic service brake is operatively connected to a rear wheel of the off-highway vehicle.

7. The braking system of claim 1, wherein, in response to receiving the retard command upon actuation of the retard pedal independent of actuation of the brake pedal, if the amount of traction motor retarding effort available from the traction motor is equal to or greater than the total retarding effort required to brake the vehicle, the control unit is configured to control the traction motor to provide the total retarding effort required to brake the vehicle without controlling the braking device to provide any braking effort.

8. A vehicle, comprising:
   a drive system including a traction motor connected in driving relationship to a wheel of the vehicle, the traction motor being configured to provide both motive power to propel the vehicle in a propel mode of operation and retarding effort to brake the vehicle;
   a braking device configured to provide braking effort to brake the vehicle;
   a brake pedal operably connected to the braking device for manual control of the braking device, wherein manual actuation of the brake pedal initiates braking effort by the braking device;
   a controller communicatively coupled to the drive system and the braking system; and
   a retard pedal that is a portion of the brake pedal and communicatively coupled to the controller, the retard pedal being actuatable by an operator independent of the brake pedal to provide a retard command to the controller, the retard command representing a request for the retarding effort by the traction motor, the retard pedal including a sensor to register the retard command based on the manual actuation of the retard pedal;
   wherein, responsive to receiving the retard command upon actuation of the retard pedal independent of actuation of the brake pedal, the controller is configured to determine a total retarding effort required to brake the vehicle and an amount of traction motor retarding effort available from the traction motor and,
   if the amount of traction motor retarding effort available from the traction motor is less than the total retarding effort required to brake the vehicle, the controller is configured to control the traction motor to apply the available traction motor retarding effort and to automatically control the braking device to provide the braking effort to supplement the traction motor retarding effort and meet the total retarding effort.

9. The vehicle of claim 8, wherein the controller is configured to control the braking device to provide a braking effort in an amount approximately equivalent to the difference between the total retarding effort and the available traction motor retarding effort of the traction motor.

10. The vehicle of claim 8, wherein the braking system device includes a hydraulic service brake.

11. The vehicle of claim 10, wherein:
    the hydraulic service brake includes an electro-hydraulic proportional valve; and the controller is configured to control a position of the electro-hydraulic proportional valve to meet the total retarding effort.

12. The vehicle of claim 11, wherein the vehicle is an off-highway vehicle, and the hydraulic service brake is operatively connected to at least one rear wheel of the off-highway vehicle.

13. The vehicle of claim 8, wherein, in response to receiving the retard command upon actuation of the retard pedal independent of actuation of the brake pedal, if the amount of traction motor retarding effort available from the traction motor is equal to or greater than the total retarding effort required to brake the vehicle, the control unit is configured to control the traction motor to provide the total retarding effort required to brake the vehicle without controlling the braking device to provide any braking effort.

14. A method for controlling a vehicle, comprising:
receiving a retard command responsive to manual actuation of a retard pedal of the vehicle, the retard pedal that is a portion of a brake pedal of the vehicle that controls a service brake, the retard pedal including a sensor to register the retard command based on the manual actuation of the retard pedal, wherein the retard command is received responsive to the manual actuation of the retard pedal independent of manual actuation of the brake pedal, the retard command representing a request for retarding effort from a traction motor of the vehicle to brake the vehicle;
determining a total amount of retarding effort required to execute the retard command;
determining an amount of retarding effort available from the traction motor; and
responsive to determining that the amount of retarding effort available from the traction motor is less than the total amount of retarding effort required, controlling the traction motor to provide the available retarding effort and
automatically controlling the service brake to provide braking effort to supplement the available retarding effort provided by the traction motor and approximately equal the total amount of retarding effort required to execute the retard command.

15. The method according to claim 14,
wherein the service brake is automatically controlled to provide an amount of braking effort that is approximately equal to the difference between the total amount of retarding effort required to execute the retard command and the amount of braking effort available from the traction motor.

16. The method according to claim 15, wherein the service brake is automatically controlled to provide the braking effort by controlling a position of an electro-hydraulic proportional valve of the service brake.

17. The method according to claim 14, wherein receiving the retard command includes receiving the retard command at a control unit of an off-highway vehicle.

18. The method of claim 14, further comprising, responsive to determining that the amount of retarding effort available from the traction motor is equal to or greater than the total amount of retarding effort required, controlling the traction motor to provide the total amount of retarding effort required without controlling the service brake to provide any braking effort.

* * * * *